US006724846B1

United States Patent
Lo

(10) Patent No.: US 6,724,846 B1
(45) Date of Patent: Apr. 20, 2004

(54) SIMPLE, HIGH PERFORMANCE, BIT-SLICED MESOCHRONOUS SYNCHRONIZER FOR A SOURCE SYNCHRONOUS LINK

(75) Inventor: Karen Lo, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,143

(22) Filed: Apr. 28, 2000

(51) Int. Cl.[7] ................................................. H04L 7/00
(52) U.S. Cl. ........................................ 375/354; 375/372
(58) Field of Search ................................. 375/372, 354, 375/371; 365/189.01

(56) References Cited

U.S. PATENT DOCUMENTS

| | | |
|---|---|---|
| 4,535,446 A | 8/1985 | Mountain |
| 5,109,488 A * | 4/1992 | Dijkstra et al. ............. 711/201 |
| 5,502,752 A | 3/1996 | Averbuch et al. |
| 6,005,901 A | 12/1999 | Linz |

FOREIGN PATENT DOCUMENTS

| | | |
|---|---|---|
| WO | WO 97/17777 | 5/1997 |
| WO | WO 99/62226 | 12/1999 |

* cited by examiner

*Primary Examiner*—Don N. Vo

(57) ABSTRACT

The present invention provides a highly reliable synchronizer which provides excellent synchronization without using complicated PLL or DLL circuitry, which is simple to test, which is easily adaptable to systems which use bit-sliced data, and which does not require large chip area. The synchronizer is comprised of a first stage, a data capture circuit, preferably comprised of pair of master-slave flip-flops, that is electrically coupled to a second stage, a data selection circuit that preferably includes a FIFO comprised of N transparent latches that are electrically coupled to a multiplexer. The lack of complexity of the synchronizer design makes it smaller, faster, easier to test, and less prone to design error and manufacturing limits.

21 Claims, 5 Drawing Sheets

SIMPLE, HIGH PERFORMANCE, BIT-SLICED MESOCHRONOUS SYNCHRONIZER FOR A SOURCE SYNCHRONOUS LINK

REFERENCE TO RELATED APPLICATIONS

Reference is made to the following co-pending and commonly assigned U.S. patent applications entitled: "Method and Apparatus for Initializing a Synchronizer Across Multiple Bit-Sliced Interfaces", Ser. No. 09/561,142, filed on Apr. 28, 2000, "Halting Datastrobes on a Source-Synchronous Link To Debug Data Capture Problems", having Ser. No. 09/560,364, filed on Apr. 28, 2000, "Method of Creating Clock and Data Equally At The Transmitter Side of A Source Synchronous Loop", having Ser. No. 09/560,214, filed on Apr. 28, 2000.

BACKGROUND OF THE INVENTION

High performance mesochronous synchronizers are used to synchronize data between two clocks which are synchronous (originating from the same source) but have an unknown phase relationship. Mesochronous synchronizers for source-synchronous links synchronize data that is in the domain of the clock that is sent with the data ("data strobe") to the receiving chip's core clock domain. The data strobe and the receiving chip's clock are mesochronous because the data strobe is created from the sending chip's core clock, which is generated from the same source (a crystal oscillator) as the receiving chip's clock.

The unknown phase relationship between the data strobe and the receiving chip's clock is caused by a number of factors including: 1) the latency of data traveling from the sending chip to the receiving chip, 2) the clock skew between the sending chip and the receiving chip and 3) process, voltage, temperature (PVT) variations. Regarding the latency of data traveling from the sending chip to the receiving chip, this latency is primarily due to package delays, board trace lengths, etc. The problem this arbitrary latency creates is that when the data strobe arrives at the receiving chip, the system designer does not know where the clock edge of the data strobe is relative to the clock edge of the receiving chip's core clock.

The unknown phase relationship between the data strobe and the receiving chip's clock is also caused by clock skew between the two chips. The clock on the sending chip generates the data strobe. Thus, if the sending chip clock and the receiving chip clock have an unknown phase relationship due to clock skew, so will the data strobe and the receiving chip clock, even before the data strobe is sent onto the link.

The third factor causing the unknown phase relationship between the data strobe and the receiving chip's clock are PVT variations. Boards and the chips on the boards can vary in speed due to variations in the manufacturing process. Because of differences in manufacturing process, different parts of the same board or chip can also have variations due to manufacturing process variations. Thus, even the same circuit on different chips (that have the same design) could have differences in timing. These differences in timing can lead to phase uncertainty.

For a source synchronous link, typically a phase-locked loop (PLL) or delay-locked-loop (DLL) device at the receiving chip interface compares the incoming data strobe and the receiving chip's clock signals and produces an analog error signal that represents the relationship between the two signals. The analog error signal is used by other PLLs or DLLs to adjust the timing of the incoming data bits by the same relationship. The receiving chip clock can then be used to sample data without fear of metastability in a minimum amount of time.

The PLL or DLL circuitry works well in distributing the chip's core clock to different chip locations so that all locations on the chip see substantially the same core clock signal. However, one of the main problems with PLL or DLL circuitry is its complexity. The complexity of the PLL circuitry increases the possibility of manufacturing faults and design errors and makes the synchronizer hard to test by traditional testing methodologies without interfering with synchronizer performance.

Conventional testing methodologies can result in decreased synchronizer performance. One testing methodology typically requires adding a device, for example a multiplexer, in the data path which adds latency to the functional path. The synchronizer could also be testing by hanging an observation flip flop off the node under test. This configuration would result in increased loading due to the capacitive loading of the flip flop. The increased loading may result in increased latency which is clearly undesirable and may result in decreased system performance Another problem with using DLL or PLL circuitry is the amount of chip area required for synchronizer implementation. Although not practical, in the ideal case the receiving chip would have a PLL or DLL synchronizer device for each bit where a clock signal is received. Obviously, this would take a large amount of chip area, which is undesirable so typically a tradeoff between ideal performance and ideal clock signal timing is balanced against the amount of chip area required for implementation.

Today's high performance systems require a large bandwidth. In order to achieve the large bandwidth required in a reasonable area, synchronizers must be small and simple. Bandwidth can be increased by bitslicing logical data among different chips, in which case the synchronizers must be able to send all parts of a data packet to the chip cores in lockstep. However, a problem with PLL and DLL circuitry is that the circuitry cannot be easily used in a system that must synchronize data across multiple bitsliced interfaces where the data must be synchronized by different chip clocks in lockstep. Conventionally, communication among the different chips would have to occur because of 1) clock skew between the chips and 2) varying tracelengths from the sending chip(s) to the receiving chip(s) that make it unknown when data in different slices arrive relative to one another and what their strobes' phase relationship is. Communication between different chips would increase link latency, increase system complexity, and increase PLL or DLL circuit complexity.

A highly reliable synchronizer circuit which provides excellent synchronization without using complicated PLL or DLL circuitry, which is simple to test, which is easily adaptable to system which use bit-sliced data, and which does not require a large chip area is needed.

SUMMARY OF THE INVENTION

The present invention provides a highly reliable synchronizer which provides excellent synchronization without using complicated PLL or DLL circuitry, which is simple to test, which is easily adaptable to systems which use bit-sliced data, and which does not require large chip area. The synchronizer is comprised of a first stage, a data capture circuit, preferably comprised of pair of master-slave flip-flops, that is electrically coupled to a second stage, a data interface circuit that preferably includes a FIFO comprised of N transparent latches that are electrically coupled to a multiplexer. The lack of complexity of the synchronizer design makes it smaller, faster, easier to test, and less prone to design error and manufacturing limits.

The synchronizer has a low latency because of 1) its simple design and 2) its clocking scheme. The synchronizer design preferably includes two stages; a first stage comprised of two data capture flip flops connected in parallel and a second stage comprised of N transparent latches electrically coupled to a multiplexer. Thus, in the preferred embodiment, data only passes through two stages of sequential elements and a multiplexer before being clocked into the receiving chips' clock domains, so that the synchronizer is both fast and small. Thus, the latency of the synchronizer can as small as the clk-q of a master-slave data capture flop plus the delay through the transparent latch and the delay through a multiplexer.

Regarding the clocking scheme, the transparent latches in the FIFO are clocked on the clock edge opposite to the edge clocking the first flip flop. This makes data available to be registered by the receiving chip's clock domain sooner, which reduces the amount of time the receiving chip wastes waiting for data to be available. Using transparent latches clocked in this manner also allows for more tolerance in data to strobe matching going from data capture flip flops to the FIFO because the latching edge of the FIFO latches naturally falls in the middle of the data's valid window. The data's valid window is twice as long as it was going into the data capture flops, which gives additional tolerance.

The simple low latency synchronizer described by the present invention was designed for source-synchronous links going to multiple bit-sliced chips. Bitslicing with low latency is achieved using a FIFO in the synchronizer and through the use of a synchronization signal called the global frame clock (GFC). The second stage of the synchronizer, which implements a FIFO, allows data symbols to wait for other data in its logical packet so that data symbols can be sent to their respective chip cores in lockstep. The GFC marks a unique chip core clock cycle on each chip, thus allowing the synchronizer control logic to pull data from the FIFO on the same clock edge. The GFC is distributed to all the chips on the link so that none of the chips need to communicate directly. This allows synchronization of bitsliced data to be much faster than if communication between the chips had to take place. The synchronizer design can be used with any number of bitsliced interfaces.

An additional advantage of the synchronizer of the present invention is that the synchronizer design can be easily used for double-pumped source-synchronous link by duplicating the same logic and running them off of the opposite edges of the link strobe. This flexibility is advantageous because it allows twice as much data to flow through the data link without doubling the complexity of the synchronizer.

A further advantage of the synchronizer of the present invention is that the two stages of sequential elements in the link strobe domain allow the synchronizer to decouple the electrical needs of the high-speed link from the synchronization needs of a bit-sliced link so that both data capture and synchronization can be achieved without compromising the other. Electrically the link desires as light a load as possible (fewer flip flops) close to the receiver. The first stage of the synchronizer is used to capture data coming from the link, so it only requires flip flops enough to register the data, enabling a smaller load on the data. The second stage of the synchronizer contains transparent latches making up the synchronizer's FIFO.

However, synchronization is not straightforward with bit-sliced data (data to be synchronized with one another arrive at very different times, clock skew and other variations are large, trace lengths are long, etc.) so the synchronizer desires a large number of latches in the FIFO. Since the link does not see any loading due to it, the FIFO can contain as many latches as are needed to address all the synchronization issues of a bit-sliced interface. Also, any additional complexity that comes with the synchronizer circuit and the FIFO is decoupled from the sensitive data capture flops.

Finally, since the synchronizer is made up of everyday logic elements, testability is relatively easy. The synchronizer enables testing to occur without complicating the circuits or adding loading or latency to the functional paths. In the preferred embodiment, an eight-to-one multiplexer is used to choose between six transparent latches. A testability input can be inserted on one of the two remaining unused multiplexer inputs, thus bypassing the synchronizer. This allows the core of the chip to be tested with no effect on the synchronizer latency and only minor changes to the FIFO control logic. Other bypass modes could be envisioned as well.

A further understanding of the nature and advantages of the invention described herein may be realized by reference to the remaining portion of the specification and the attached drawings.

DETAILED DESCRIPTION OF THE PREFERRED EMBODIMENTS

Figure 1A:
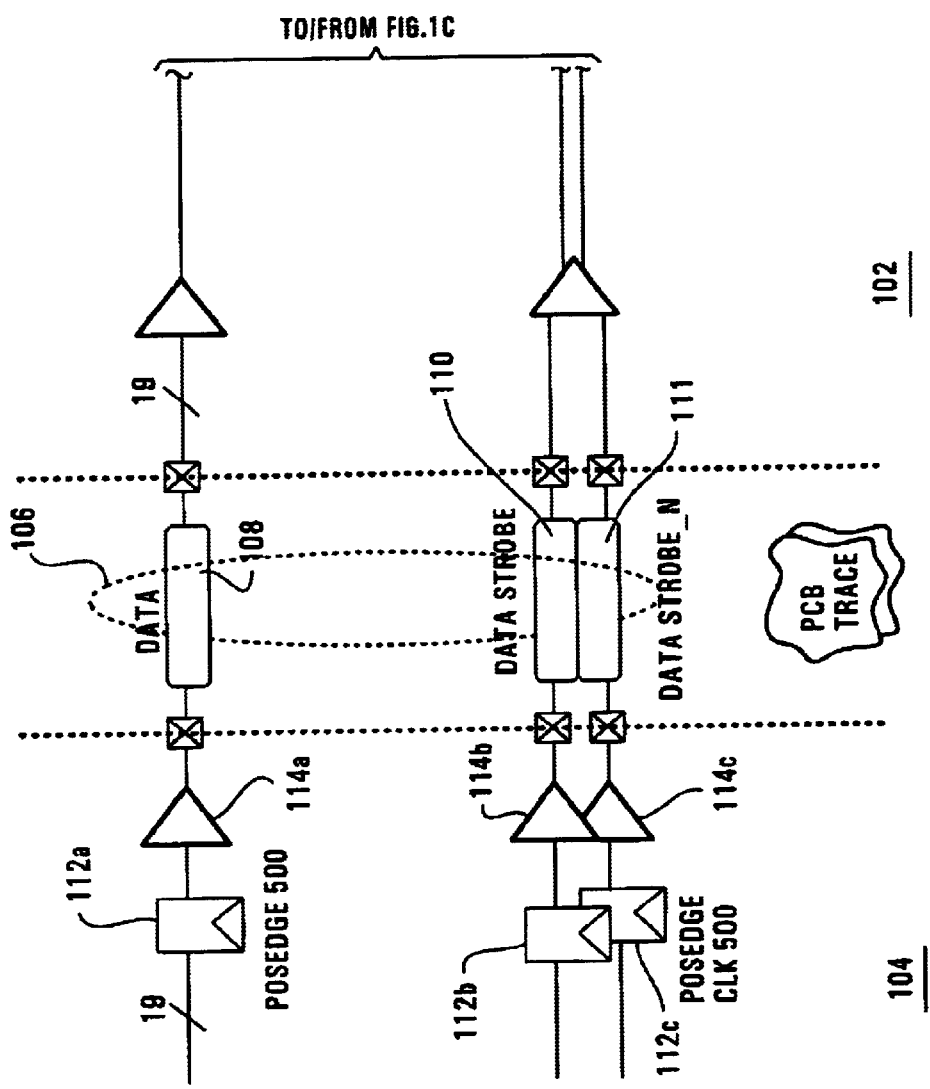
FIG. 1 shows a synchronizer circuit according to one embodiment of the present invention.
Figure 1B:
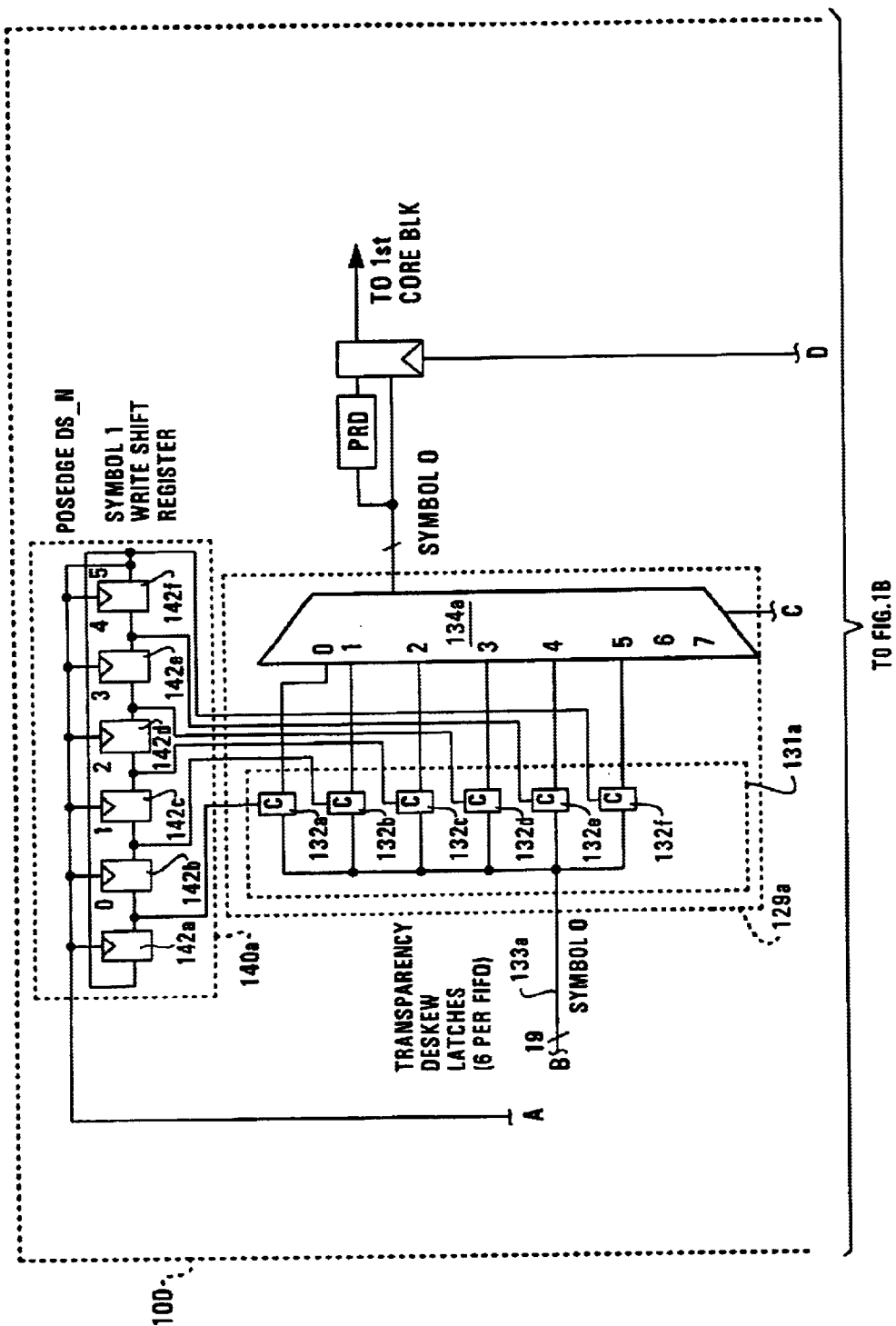
Figure 1C:
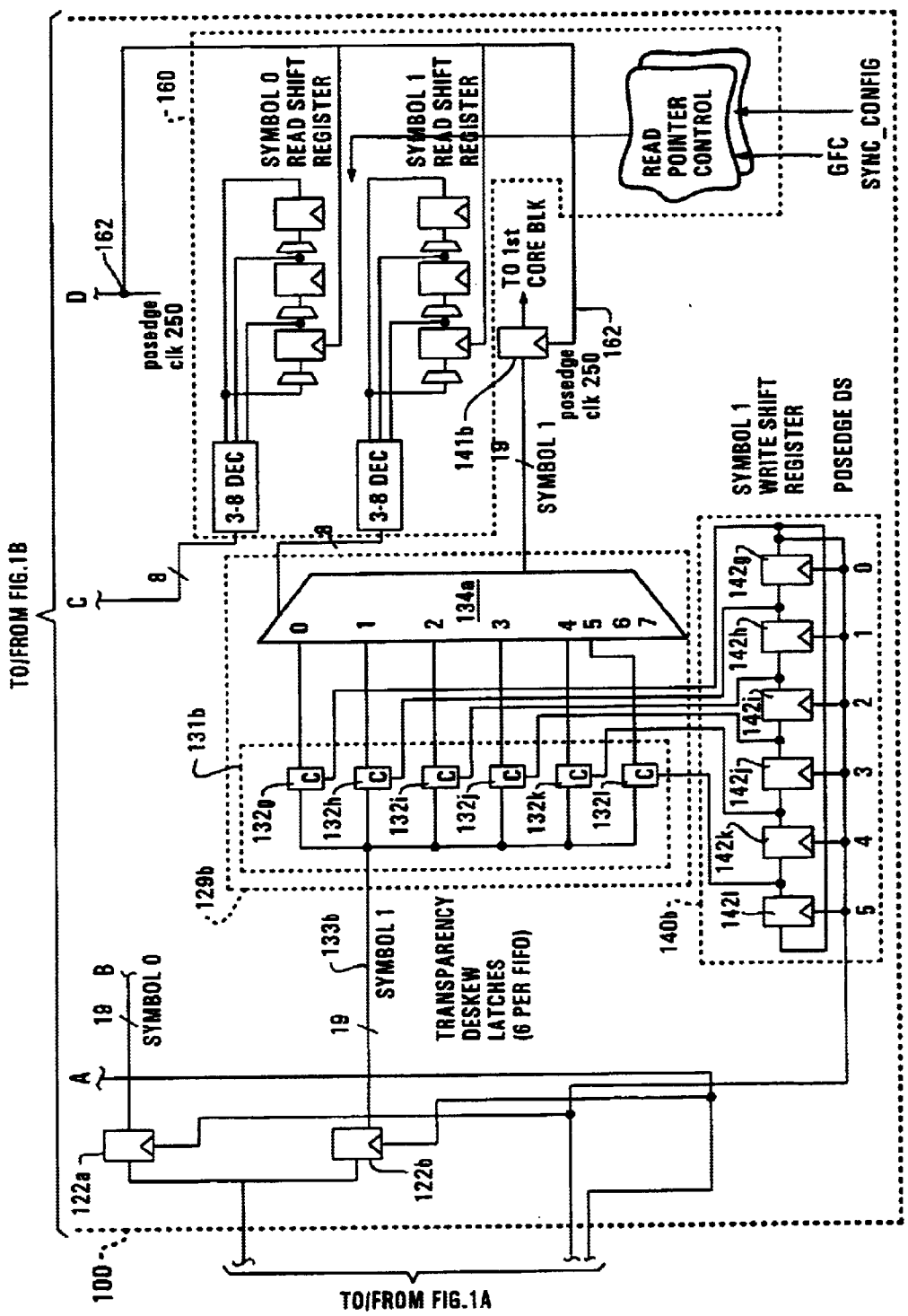

FIG. 1 shows a partial block diagram of the sending chip and receiving chip electrically coupled via a link. Although the bit-sliced synchronizer 100 of the present invention can be physically separate from the receiving chip, in the preferred embodiment the synchronizer 100 is physically located on the receiving chip 102. The synchronizer 100 of the receiving chip 102 is electrically coupled to the sending chip 104 via a link 106 that includes a data bus 108, a data strobe (DS) clock signal 110, and a data strobe not (DS_N) signal 111. In the preferred embodiment, the DS 110 and DS_N 111 are differential signals.

The partial block diagram of the sending chip 104 shows the last flip flops 112a, 112b, 112c on the sending chip 104 before the driver circuitry 114a, 114b, 114c. The driver circuitry 114a, 114b, 114c is used to drive the data link 108 and the DS 110 and DS_N 111 signals respectively. In the embodiment shown in FIG. 1, the data link 108 is 19 bits while the DS and DS_N signals 110, 112 are a single bit.

The data 108 signal is sent over the link 106 for reading by the data capture circuit 120 of the synchronizer 100. In the embodiment shown, the data capture circuit 120 is comprised of two data storage circuits 122a, 122b connected in parallel. Preferably, the data storage circuits 122a, 122b are identical master-slave flip flops. The flip flops 122a and 122b are controlled by the DS and DS_N signals where data is latched from the data link into flip flop 122a on the positive edge of the DS signal 110 and data is latched from the data link into flip flop 122b on the positive edge of the DS_N signal 112. In an alternative embodiment, data could be latched into the flip flop on the negative edge of the DS and DS_N signals.

Figure 2:
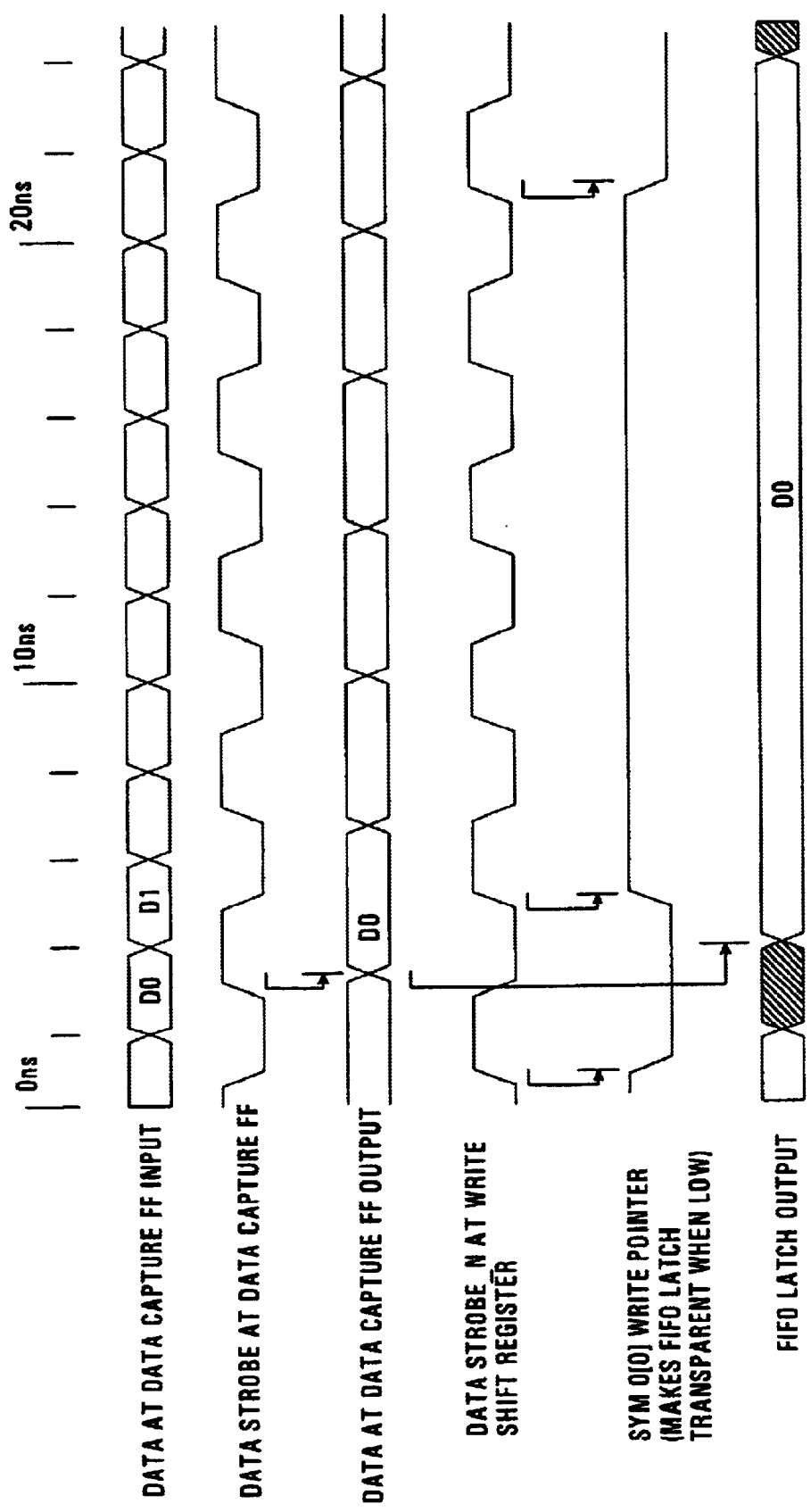
FIG. 2 shows a timing diagram of the synchronizer clocking according to one embodiment of the present invention.

In the embodiment shown in FIG. 1, data is captured by the data capture circuit 120 at a very high speed. Data is double-pumped so that data read from the link alternates between the two master slave flip flops 122a, 122b. FIG. 2 shows a timing diagram of the synchronizer clocking according to one embodiment of the present invention. The first timing diagram shown in FIG. 2 shows data at node 108, the input to the master-slave flip-flop 122a. The second timing diagram shown in FIG. 2 shows the data strobe signal at the node 110, the clock signal input to the master slave flip flop 122a.

Referring to FIG. 2, when the data strobe signal transitions high, data, for example data D0, is latched into data storage circuit 122a. Data is double-pumped on the link so that the data immediately following data D0, in this case data D1, is registered into the identical master slave flop 122b clocked off the falling edge of DS, which corresponds to the positive edge of DS_N. This configuration allows for data to be captured (latched) quickly before the data signal deteriorates.

In the described system, 4-way bitslicing is used. (Although only one chip is shown in FIG. 1, in the preferred system there are two slices per chip on two different receiving chips.) However, the described system could also be used for N-way bitslicing, where N is an integer greater than or equal to two. Further, the synchronizer can also be used for a system where a non-bitsliced chip sends data and clock signals to a non-bitsliced chip, where N bitsliced chips send data and clock signals to a single non-bitsliced chip, where a non-bitsliced chip sends data and clock signals to N bitsliced chips, or where N bitsliced chips send data and clock signals to N bitsliced interfaces.

In the preferred embodiment, the synchronizer 100 includes a second stage, a data interface circuit 129a, 129b that includes a data buffer circuit, preferably a FIFO, comprised of N transparent data storage circuits that are electrically coupled to a data selection circuit 134a, 134b, typically a multiplexer. In the embodiment shown in FIG. 1, the data selection circuit 134a, 134b includes two data buffer circuits 131a, 131b, where the input 133a, 133b of each data buffer circuit 131a, 131b is electrically coupled to an output of the data capture circuit 120. Each data buffer circuit 131a, 131b is comprised of a plurality of data storage circuits 132a–f, 132g–l, preferably N transparent latches, connected in parallel. The output of each of the data storage circuits 132a–f, 132g–l is electrically coupled to the data selector circuit 134a, 134b.

Although in the partial block diagram of the system shown in FIG. 1 the data interface circuit includes two data buffer circuits each comprised of six latches, the number of latches can vary. For example, the number of latches in each FIFO can be made larger to accommodate increased data travel latency between chips. The number of latches in the FIFO is intended to create a long data valid window that 1) allows the frequency to be slowed down to DC and still have the synchronizer work; 2) covers the largest range in arrival time among data in the same logical data packet, which must be registered by the receiving chips' core clocks in lockstep; and 3) takes into account variations on the different sides of the link due to clock skew, process, as well as dynamic variations in voltage and temperature.

The output of each data storage circuit 132a–f, 132g–l is electrically coupled to a corresponding data selector circuit 134a, 134b that chooses which of the N data storage circuits 132a–f, 132g–l is selected for output. In the embodiment shown in FIG. 1, the data selector circuit is an 8:1 multiplexer. Since only six of the multiplexer's eight possible inputs are connected to data storage circuits, two multiplexer inputs are available for other functions. For example, a testability input could be inserted onto one of the two available multiplexer inputs to bypass the synchronizer and test the core of the chip with no effect on the synchronizer latency and only minor changes to the read select circuit 160.

The two data buffer circuits 131a, 131b of the data interface circuit 129a, 129b are electrically coupled to write control logic 140a, 140b. The write control logic circuit 140a, 140b is comprised of a plurality of data storage circuits 142a–f, 142g–l connected in series in a loop configuration so that the output of the last data storage circuit (142f,142l) is the input to the first data storage circuit (142a, 142g). Because of the loop configuration, data stored in the latches 132a–f and 132g–l is stored in a first in first out manner. The write control logic 140a, 140b controls when the data storage latches 132a–f, 132g–l are transparent so that data from the data capture flop is latched and available for selection by the multiplexer 134a, 134b. The timing of when the data is selected by the multiplexer and read by the first flops 141a, 141b of the receiving chip 102 is controlled by the read select circuit.

The write control circuit 140a is initialized with a 0 (symbol 0). A symbol 0 is written into a single latch of the plurality of data storage circuits 142a–f. Similarly, the write control circuit 140b is initialized with a symbol 0. The symbol 0 is written into a single latch of the plurality of data storage circuits 142g–l. The clock signal for the write control latches 142a–f is DS_N while the clock signal for the write control latches 142g–l is DS. The output of each latch is the clock signal input for each of the data storage latches of the data buffer circuits 132a–f, 132g–l. Although in the described embodiment, the symbol 0 is unique for the data storage circuits such that 0 is written into one data storage circuit while the other data storage circuits are written with a 1, in an alternative embodiment, the unique value could be the symbol 1 instead of 0.

Figure 3:
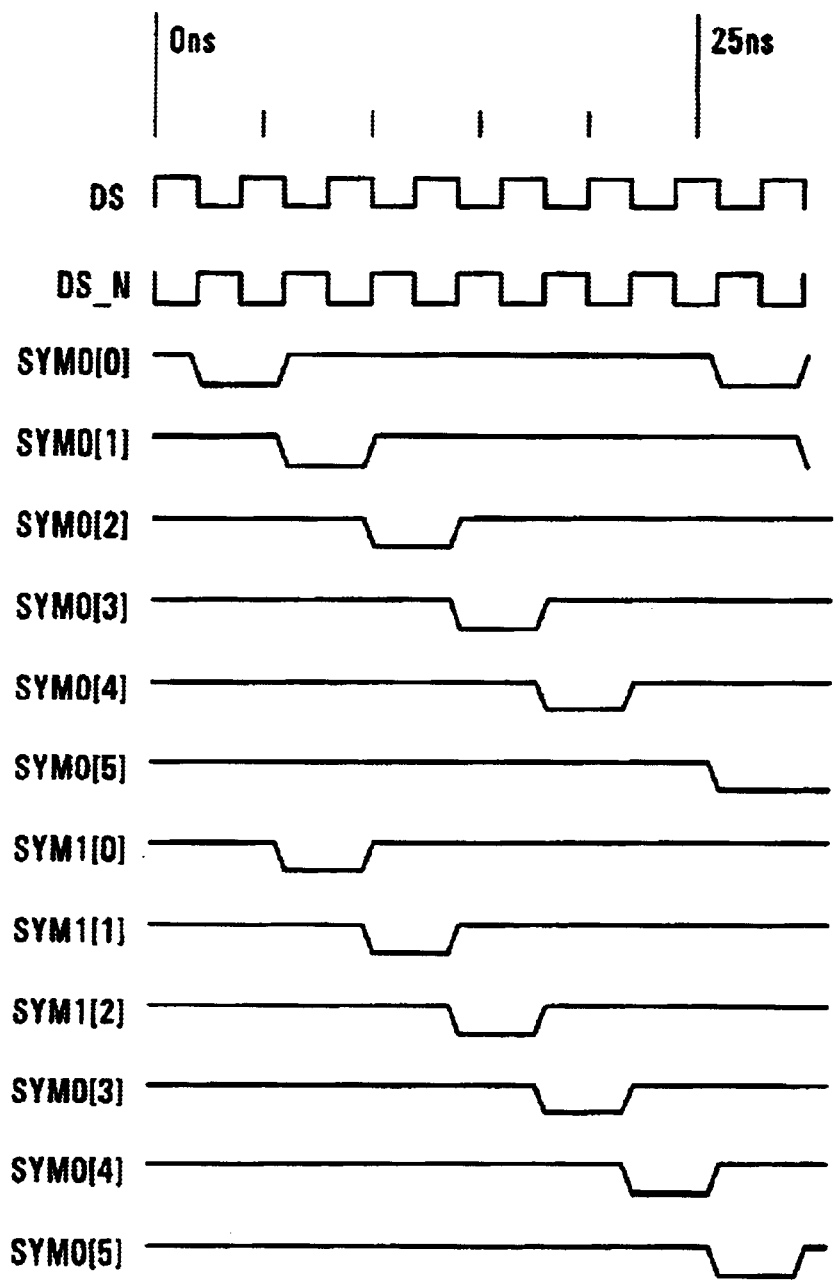
FIG. 3 shows a timing diagram of the data strobe clock and write control logic output of the synchronizer according to one embodiment of the present invention.

FIG. 3 shows a timing diagram of the DS and DS_N signals and their relationship to the write select signals of the write control circuit block of the present invention. The timing diagram of the DS and DS_N in FIG. 3 are represented with straight edges for the leading and trailing edge of the signal. Timing diagrams 3–8 (labeled sym0[0]–sym0[5]) are representative of the signals of nodes 0–5 in the write control logic circuit 140a where a logic 0 is written in a single latch. Similarly, the timing diagrams 9–14 (labeled sym1[0]–sym1[5]) are representative of the signals of nodes 0–5 in the write control logic circuit 140b where the symbol 0 is written in a single latch.

Referring to FIG. 2, the third timing diagram (data at data capture FF output) is representative of the data signal that appears at node 133a, while the fourth timing diagram (data strobe_N at write shift register) is representative of the clock signal that appears at node 154. Again referring to FIG. 2, the fifth timing diagram (write pointer (makes FIFO latch transparent when low)) is representative of the write pointer at one of the nodes (0, 1,2,3,4,5) of the write control logic 140a. The sixth timing diagram (FIFO latch output) is representative of data output from one of the data storage circuits 132a–f. Referring to FIG. 2, when the write pointer for a particular data storage circuit 132a–f is low, that particular data storage circuit 132a–f becomes transparent and data is latched by the data storage circuit.

Referring to the timing diagram of FIG. 3, it can be seen that the symbol 0 is shifted through the data latches 142a–f turning on each of the data latches 132a–f sequentially so that the data latches 132a–f become transparent. For example, the timing diagram labeled sym0[0] is representative of node 0 for the write control circuit 140a. Referring to FIG. 3, when the write control logic pointer for node 0 is low, the corresponding latch 132a becomes transparent. Referring to FIG. 3, the next sequential latch 132b becomes transparent when symo[ 1], which corresponds to the write control logic pointer for node 1 for the write control circuit 140a, becomes low.

The data selection circuit 134a,134b of the data interface circuit 129a, 129b is electrically coupled to both the read select circuitry 160 and the first flops 141a, 141b of the receiving chip 102. The core clock 162 is an input to the sending chip 102. Similarly, the core clock 162 is an input to the receiving chip 102 and the read select circuit 160.

The synchronizer 100 is used to synchronize data from a first clock domain to a second clock domain. The read select circuit 160 of the synchronizer includes a cycle delay storage element which stores a synchronization configuration value (SYNC_CONFIG). Data is read from the data latches 132a–f, 132g–l of the synchronizer and latched into the flip flops 141a, 141b on the receiving chip in a second clock domain. Data is read from data latches 132a–f, 132g–l a predetermined number of cycles after receiving a unique clock cycle identifier (the GFC), where the predetermined number of cycles is determined by the value of the cycle delay storage element. Although in the preferred embodiment a two stage data buffer (data capture stage 120, data buffer stage 131a, 131b) is used to hold data until it is ready to be latched by the receiving chip flops 141a, 141b, in an alternative embodiment, a single stage data buffer could be used for this purpose.

The read select circuit 160 determines the timing of when data is read from the multiplexer 134a, 134b. The read select circuit 160 includes synthesized control logic (not shown) and a shift register. The synchronizer configuration value, along with the GFC, tells the read control logic when the multiplexer should be selecting data from which input, thus making the data available to be latched by the flops 141a, 141b in lockstep with corresponding flops on other chips.

The synchronizer configuration bits, in the preferred embodiment two bits, are determined prior to synchronizer initialization and are dependent on the worst case latency of the synchronizer. Because the circuit configuration, length of wires, resistance of wires, number of circuit elements, impedances associated with circuit elements is known, the worst case latency can be calculated. The worst case latency is assumed in order to ensure that valid data is read. The synchronizer configuration bit also allows adjustability during lab link debug and characterization. After validation and testing in the lab, the final value for volume shipments can be set.

The read select circuit 160 chooses one of the multiplexer inputs which are fed by a transparent latches. The data is read as soon as all the data in the same logical packet have arrived. Analysis of the link trace lengths and circuit elements determines how many cycles this requires and the GFC, which provides a synchronous edge among all the bitsliced interfaces, tells each synchronizer when to read the data into the receiving clock domain. When data is read into the receiving clock domain is determined by the synchronizer configuration bits of the read select circuit 160.

The read select circuitry 160 controls when and which input of the multiplexer is selected. During initialization or error or reset, the GFC and synchronizer configuration bits are used to initialize the data in the read control logic and ensure that the bitsliced chips are in lockstep. Further information on the initialization of the synchronizer circuit can be found in the patent application "Method and Apparatus for Initializing a Synchronizer Across Multiple Bit-Sliced Interfaces", Ser. No. 09/561,142, filed on Apr. 28, 2000, which is hereby incorporated by reference.

It is understood that the above description is intended to be illustrative and not restrictive. The scope of the invention should be determined with reference to the appended claims, along with the full scope of equivalents to which such claims are entitled.

What is claimed is:

1. A synchronizer for synchronizing data latched from a first clock domain to a second clock domain, comprised of:
   a data buffering circuit including a plurality of data latches for storing data from a sending chip, wherein the data from the sending chip is latched in the first clock domain;
   a read select circuit including a cycle delay storage element, the read select circuit electrically coupled to the data buffering circuit, wherein the read select circuit controls when data is read from the data buffering circuit into the second clock domain of the receiving chip, where data is read from the data buffering circuit a predetermined number of cycles after receiving a unique clock cycle identifier, wherein the predetermined number of cycles is determined by the a value of the cycle delay storage element.

2. The synchronizer according to claim 1, further comprising a data capture circuit for receiving data from the sending chip and for forwarding the data to the data buffering circuit.

3. The synchronizer according to claim 2, wherein the data from the sending chip is clocked on leading and trailing edges in the first clock domain and wherein the data capture circuit forwards data clocked on the leading edge to the data buffering circuit and forwards data clocked on the trailing edge to a second data buffering circuit.

4. The synchronizer according to claim 3, wherein the first data buffering circuit is clocked according to the leading edges and the second data buffering circuit is clocked according to the trailing edges.

5. The synchronizer according to claim 4, wherein the data capture circuit comprises a first flip-flop clocked according to the leading edges and a second flip-flop clocked according to the trailing edges.

6. The synchronizer according to claim 1, further comprising write control logic comprising a plurality of storage elements arranged in a loop.

7. The synchronizer according to claim 6, wherein each data latch is activated in turn according to a symbol shifted through the plurality of storage elements of the write control logic.

8. The synchronizer according to claim 7, wherein the symbol is shifted in the first clock domain.

9. The synchronizer according to claim 1, wherein the data is bitsliced and the unique clock cycle identifier provides a synchronous edge among a plurality of bit-sliced interfaces.

10. The synchronizer according to claim 1, wherein the latches of the data buffering circuit are transparent.

11. The synchronizer according to claim 1, wherein the read select circuit comprises a data selector having a plurality of inputs coupled to the data latches for selectively reading data from the latches in the second clock domain.

12. The synchronizer according to claim 11, wherein the data selector comprises a multiplexer.

13. The synchronizer according to claim 11, wherein the data selector is controlled to select each of the data latches in turn according the predetermined number of clock cycles.

14. A synchronizer for synchronizing data latched from a first clock domain to a second clock domain, comprised of:

a data buffering circuit including a plurality of data latches for storing data from a sending chip, wherein each data latch is activated in turn according to a symbol shifted through a shift register in the first clock domain; and a read select circuit including a data selector having a plurality of inputs coupled to the data latches for selectively reading data from the latches in the second clock domain wherein the data selector is controlled to select each of the data latches in turn according to a delay of a predetermined number of clock cycles.

15. The synchronizer according to claim 14, further comprising a data capture circuit for receiving data from the sending chip and for forwarding the data to the data buffering circuit.

16. The synchronizer according to claim 15, wherein the data from the sending chip is clocked on leading and trailing edges in the first clock domain and wherein the data capture circuit forwards data clocked on the leading edge to the data buffering circuit and forwards data clocked on the trailing edge to a second data buffering circuit.

17. The synchronizer according to claim 16, wherein the first data buffering circuit is clocked according to the leading edges and the second data buffering circuit is clocked according to the trailing edges.

18. The synchronizer according to claim 17, wherein the data capture circuit comprises a first flip-flop clocked according to the leading edges and a second flip-flop clocked according to the trailing edges.

19. The synchronizer according to claim 14, wherein the data is bitsliced and the unique clock cycle identifier provides a synchronous edge among a plurality of bit-sliced interfaces.

20. The synchronizer according to claim 14, wherein the latches of the data buffering circuit are transparent.

21. The synchronizer according to claim 14, wherein the data selector comprises a multiplexer.

* * * * *